(12) United States Patent
Mehew et al.

(10) Patent No.: US 10,861,012 B2
(45) Date of Patent: Dec. 8, 2020

(54) SYSTEM AND METHOD FOR SECURE TRANSACTIONS AT A MOBILE DEVICE

(71) Applicant: The Western Union Company, Denver, CO (US)

(72) Inventors: Evans Mehew, Larkspur, CO (US); Kimberly Dunwoody, Parker, CO (US); Dianna Lyons, Highlands Ranch, CO (US)

(73) Assignee: The Western Union Company, Denver, CO (US)

(*) Notice: Subject to any disclaimer, the term of this patent is extended or adjusted under 35 U.S.C. 154(b) by 0 days.

(21) Appl. No.: 16/050,133

(22) Filed: Jul. 31, 2018

(65) Prior Publication Data

US 2018/0374092 A1 Dec. 27, 2018

Related U.S. Application Data

(63) Continuation of application No. 12/894,858, filed on Sep. 30, 2010, now Pat. No. 10,043,180.

(51) Int. Cl.
*G06Q 40/00* (2012.01)
*G06Q 20/40* (2012.01)

(52) U.S. Cl.
CPC ............ *G06Q 20/40* (2013.01); *G06Q 40/00* (2013.01)

(58) Field of Classification Search
CPC ............... G06Q 40/00; G06Q 20/341; G06Q 20/40145; G06Q 20/3415; G06Q 20/40; G06Q 20/4014
USPC .............................. 705/44, 41; 235/380, 449
See application file for complete search history.

(56) References Cited

U.S. PATENT DOCUMENTS

| | | |
|---|---|---|
| 5,175,416 A | 12/1992 | Mansvelt et al. |
| 5,350,906 A | 9/1994 | Brody et al. |
| 5,590,197 A | 12/1996 | Chen et al. |
| 5,650,604 A | 7/1997 | Marcous et al. |
| 5,796,832 A | 8/1998 | Kawan |
| 5,878,337 A | 3/1999 | Joao et al. |
| 5,884,290 A | 3/1999 | Smorodinsky et al. |

(Continued)

FOREIGN PATENT DOCUMENTS

| | | |
|---|---|---|
| CN | 102722814 A | * 10/2012 |
| WO | 2009055303 | 4/2009 |

OTHER PUBLICATIONS

Clarke et al. "Biometric Authentication for Mobile Devices" 2002 3rd Australian Information Warfare and Security Conference 2002.*

(Continued)

*Primary Examiner* — Kelly S Campen
(74) *Attorney, Agent, or Firm* — Kilpatrick Townsend & Stockton, LLP

(57) ABSTRACT

A system and method for conducting money transfer transactions using mobile devices includes a money transfer host computer that facilitates the collection of fingerprint data for the mobile devices and personal data for users of the mobile devices. The personal data can include a user photo. In order to enable the mobile devices, both the fingerprint data and the personal data are collected, and at least the personal data is verified. To authorize transactions at an enabled mobile device, the fingerprint data and personal data are compared to reference data, and based on the comparison and on a threshold established for the comparison, a transaction is authorized or rejected.

19 Claims, 12 Drawing Sheets

Fingerprint File

(56) References Cited

U.S. PATENT DOCUMENTS

| | | |
|---|---|---|
| 5,937,396 A | 8/1999 | Konya |
| 6,018,724 A | 1/2000 | Arent |
| 6,029,887 A | 2/2000 | Furuhashi et al. |
| 6,032,135 A | 2/2000 | Molano et al. |
| 6,076,075 A | 6/2000 | Teicher |
| 6,206,283 B1 | 3/2001 | Bansal et al. |
| 6,213,391 B1* | 4/2001 | Lewis .................. G06Q 20/341 235/380 |
| 6,250,557 B1 | 6/2001 | Forslund et al. |
| 6,327,578 B1 | 12/2001 | Linehan |
| 6,394,343 B1 | 5/2002 | Berg et al. |
| 6,424,845 B1 | 7/2002 | Emmoft et al. |
| 6,434,403 B1 | 8/2002 | Ausems et al. |
| 6,736,314 B2 | 5/2004 | Cooper et al. |
| 6,816,721 B1 | 11/2004 | Rudisill |
| 7,155,411 B1* | 12/2006 | Blinn .................... G06Q 20/02 705/40 |
| 7,330,871 B2 | 2/2008 | Barber |
| 8,301,877 B2* | 10/2012 | Grajek ................. H04L 9/3268 380/277 |
| 8,327,142 B2* | 12/2012 | Lund .................... H04L 9/3273 705/67 |
| 8,510,223 B2 | 8/2013 | Blair et al. |
| 8,700,901 B2* | 4/2014 | Lund .................... H04L 9/3273 705/67 |
| 9,288,195 B2* | 3/2016 | Lambiase ............. G06F 21/335 |
| 9,294,288 B2* | 3/2016 | Lund .................... H04L 9/3273 |
| 10,043,180 B2 | 8/2018 | Mehew et al. |
| 2002/0016763 A1 | 2/2002 | March |
| 2002/0055907 A1 | 5/2002 | Pater et al. |
| 2002/0073044 A1 | 6/2002 | Singhal |
| 2002/0073046 A1* | 6/2002 | David .................... G06F 21/33 705/67 |
| 2002/0116331 A1 | 8/2002 | Cataline et al. |
| 2002/0138423 A1 | 9/2002 | Takatori et al. |
| 2003/0023555 A1 | 1/2003 | Rees |
| 2003/0126079 A1 | 7/2003 | Roberson et al. |
| 2003/0140004 A1 | 7/2003 | O'Leary et al. |
| 2003/0149662 A1 | 8/2003 | Shore |
| 2004/0098353 A1 | 5/2004 | Smith |
| 2004/0230610 A1 | 11/2004 | Gutierrez-Sheris |
| 2005/0033994 A1* | 2/2005 | Suzuki ................. H04L 63/083 726/19 |
| 2005/0216354 A1 | 9/2005 | Bam et al. |
| 2005/0267842 A1 | 12/2005 | Weichert et al. |
| 2005/0269415 A1 | 12/2005 | Licciardello et al. |
| 2006/0210126 A1* | 9/2006 | Cho .................... G07C 9/00158 382/124 |
| 2006/0265489 A1 | 11/2006 | Moore |
| 2006/0282660 A1* | 12/2006 | Varghese ............. G06Q 20/341 713/155 |
| 2007/0022058 A1 | 1/2007 | Labrou et al. |
| 2007/0078763 A1 | 4/2007 | Babi et al. |
| 2007/0179885 A1 | 8/2007 | Bird et al. |
| 2007/0208618 A1 | 9/2007 | Paintin et al. |
| 2007/0234409 A1* | 10/2007 | Eisen ................. H04L 63/08706 726/6 |
| 2007/0294540 A1* | 12/2007 | Wadayama .......... G06Q 20/341 713/186 |
| 2008/0033877 A1 | 2/2008 | Blair et al. |
| 2008/0040271 A1* | 2/2008 | Hammad ............. G06Q 20/085 705/41 |
| 2008/0046366 A1 | 2/2008 | Bemmel et al. |
| 2008/0103972 A1 | 5/2008 | Lanc |
| 2008/0120707 A1 | 5/2008 | Ramia |
| 2008/0225118 A1 | 9/2008 | Suzuki |
| 2009/0089869 A1 | 4/2009 | Varghese |
| 2009/0265272 A1 | 10/2009 | Dill et al. |
| 2009/0288012 A1 | 11/2009 | Hertel et al. |
| 2010/0169212 A1 | 7/2010 | Paintin |
| 2010/0205095 A1 | 8/2010 | Ostrovsky |
| 2012/0078787 A1 | 3/2012 | Mehew et al. |
| 2012/0084203 A1 | 4/2012 | Mehew et al. |
| 2012/0084206 A1 | 4/2012 | Mehew et al. |
| 2012/0169212 A1 | 7/2012 | Liu et al. |
| 2013/0333013 A1* | 12/2013 | Quach .................. H04L 9/3215 726/7 |
| 2014/0082715 A1* | 3/2014 | Grajek ................ H04L 63/0815 726/8 |
| 2014/0181946 A1* | 6/2014 | Lambiase ............. G06F 21/335 726/8 |

OTHER PUBLICATIONS

Gerdes, Ryan M., et al. "Device Identification via Analog Signal Fingerprinting: A Matched Filter Approach." NDSS. 2006. (Year: 2006).*

International Search Report and Written Opinion for PCT/US10/36066 dated Jun. 28, 2010, all pages.

International Search Report and Written Opinion for PCT/US08/77224 dated Dec. 23, 2008, all pages.

Weiss, Todd R., "Flooding Complicates Relief Agency's IT Plan," Sep. 5, 2005; 39, 36; ABI/INFORM Global; p. 6.

* cited by examiner

| Number Of Transactions | 1 | 2 | 3 | 4 | 5 | 6 | ... | N |
|---|---|---|---|---|---|---|---|---|
| Comparison Threshold | 99% | 98% | 97% | 96% | 95% | 80% | ... | 80% |

Establishing Threshold (Baseline)

*FIG. 12*

SYSTEM AND METHOD FOR SECURE TRANSACTIONS AT A MOBILE DEVICE

CROSS-REFERENCES TO RELATED APPLICATIONS

This application is a continuation of U.S. patent application Ser. No. 12/894,858, filed Sep. 30, 2010, and entitled, "SYSTEM AND METHOD FOR SECURE TRANSACTION AT A MOBILE DEVICE," the entire disclosure of which is hereby incorporated by reference, for all purposes, as if fully set forth herein.

This application is related to U.S. patent application Ser. No. 12/894,456, filed Sep. 30, 2010, by Mehew et al. and entitled SYSTEM AND METHOD FOR SECURE TRANSACTIONS USING DEVICE-RELATED FINGERPRINTS, the complete disclosure of which is herein incorporated by reference in its entirety.

BACKGROUND OF THE INVENTION

This invention relates generally to mobile devices and to the use of mobile devices for financial transactions. More specifically, the invention relates to providing improved security for mobile devices, particularly when used for financial transactions, such as money transfers.

Third party money transfer services are widely used to transfer money and pay bills through the use of wire transfers, money orders, and the like. Such services, however, usually require face-to-face contact between an individual representing the third party service provider and the sender and/or the recipient. For example, if a sender is "wiring" money to a recipient, the money is typically deposited with the third party in person, and the sender typically obtains the money from the third party in person. If the money is transferred in the form of a money order, the sender typically deposits the money with the third party in person and receives a money order.

The use of mobile devices in various types of transactions is becoming more common. For example, various forms of wireless or mobile devices, such as cell phones, Personal Digital Assistants (PDAs), and mobile computers (laptop, notebook and tablet computers) can be used to initiate contactless or wireless communication with a money transfer system in order for the user of the device to transfer funds to another party. These devices provide greater convenience to the user, and can also be used to provide other functions with regard to financial accounts to which they may be linked or related.

However, money transfer services and systems are sometimes vulnerable to fraud, e.g., a dishonest person may attempt to send or receive money by impersonating a legitimate sender or recipient. While systems employing a mobile device will frequently require a user to know a unique username, a password or some other security code in order to make a transaction more secure, such arrangments can be circumvented. For example, an unauthorized person might surreptitiously learn a security code, e.g., by watching a user enter his or her code at a device, by employing systems that hack money transfer systems and gain access to codes, or by learning enough about a user to make attempts to guess a code until one guessed code is found to work.

Sometimes the financial systems to which a mobile devices are connected enhance security by being programmed to recognize a mobile device being used by a legitimate user (such as by asking for a device or user identifier stored in the device), and to reject a transaction if the proper device identifier is not received. Such an arrangement prevents fraudulent transactions by a person that uses a stolen username/security code and attempts a transaction on a device not known to the system or not associated with the stolen username/security code. However, if the mobile device itself is stolen, and the thief uses the stolen device and knows the user's security code, such security measures can be circumvented, since the system is tricked into thinking that it is connected to a legitimate user through his or her authorized device.

For these and other reasons, there is a need in the art for improving security in the use of mobile devices, and particularly for improving the security of financial transactions conducted at mobile devices.

BRIEF SUMMARY OF THE INVENTION

There is provided, in accordance with embodiments of the present invention, a system and method for enabling a mobile device to conduct transactions, such as financial transfer transactions.

In one embodiment, a method and a system is provided for capturing both fingerprint data for the device and personal data associated with a user of the mobile device. The mobile device is enabled only if both the fingerprint data and the personal data are received by a host computer, and the personal data is verified by comparing it to previously captured and stored personal data.

In another embodiment, a method and system are provided for enabling a mobile device to conduct money transfer transactions, wherein the system is configured, and the method includes steps, for capturing fingerprint data for the mobile device, capturing personal data associated with a user of the mobile device, providing the captured fingerprint data and the captured personal data to a host computer, comparing the personal data with previously captured data associated with the user in order to verify the captured personal data, enabling or activating the mobile device for use in conducting transactions if the personal data is verified, and storing the captured fingerprint data and the captured personal data, for use at the host computer in authenticating the mobile device for subsequent transactions conducted at the mobile device.

A more complete understanding of the present invention may be derived by referring to the detailed description of the invention and to the claims, when considered in connection with the Figures.

BRIEF DESCRIPTION OF THE DRAWINGS

FIG. 12 is a diagram illustrating a specific example of establishing a threshold for use in the process of FIG. 11.

DETAILED DESCRIPTION OF THE INVENTION

Figure 1:
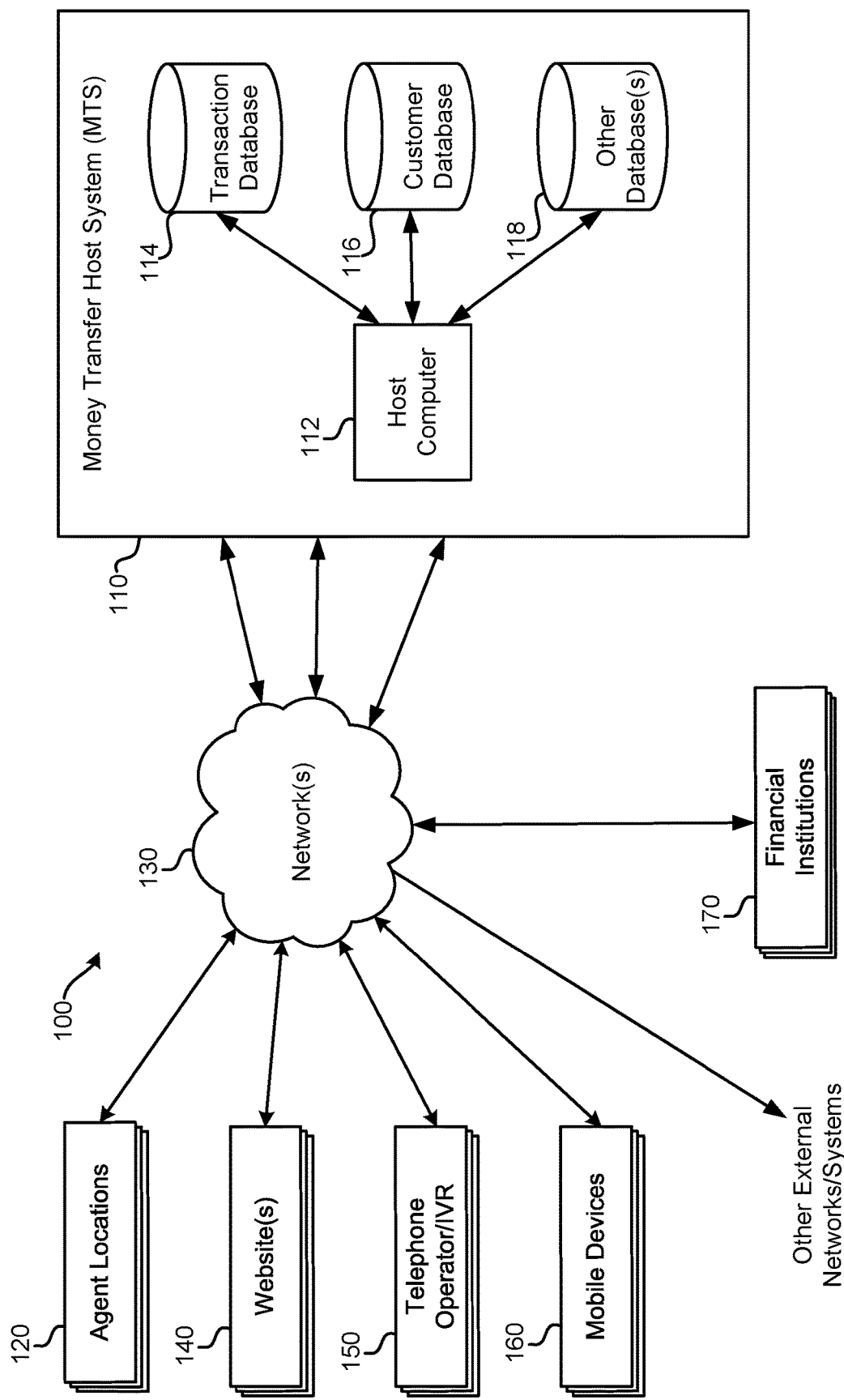
FIG. 1 is a general block diagram of a money transfer system, illustrating one embodiment of the invention.

In the following description, numerous specific details are set forth in order to provide an understanding of various embodiments of the present invention. It will be apparent, however, to one skilled in the art that embodiments of the present invention may be practiced without some of these specific details. In other instances, well-known structures and devices are shown in either block diagram form or omitted to avoid obscuring more salient features of the invention.

Generally speaking, embodiments of the present invention provide mobile devices and methods and systems employing mobile devices for supporting financial transfer transactions. Exemplary apparatus, and exemplary systems and methods for performing money transfer transactions via a mobile device, such as a cellular phone, a personal communication device (e.g., iPhone®, Blackberry®, PalmPilot® or similar device), or a portable computer (e.g., iPad®) are described in co-pending U.S. patent application Ser. No. 11/462,223 filed Aug. 3, 2006 by Blair et al., now issued as U.S. Pat. No. 8,510,223, and entitled MONEY TRANSFER TRANSACTIONS VIA PRE-PAID WIRELESS COMMUNICATION DEVICES, co-pending U.S. patent application Ser. No. 12/477,360, filed Jun. 3, 2009, by Dill et al. and entitled MONEY TRANSFERS UTILIZING A UNIQUE RECEIVER IDENTIFIER, and co-pending U.S. patent application Ser. No. 12/890,296, filed Sep. 24, 2010, by Mehew et al. now abandoned, and entitled MOBILE AGENT METHODS AND SYSTEMS, the complete disclosures of which are herein incorporated by reference in their entirety for all purposes.

In exemplary embodiments of the invention, mobile devices are used in a money transfer method and system for conducting consumer-oriented money transfer transactions between users (e.g., between a money sender/payor and a money recipient/payee). Enhanced security is provided by requiring that a mobile device be enabled or activated before permitting any transactions, and in some embodiments, also requiring that the mobile device (and its user) be authenticated or authorized before a transaction may be completed. Both enabling the mobile device (before it is able to be used for any purpose) and authenticating the mobile device (before it is able to conduct financial transactions) involve the use of captured device fingerprint data (relating to the mobile device) and/or captured personal data (relating to the user of the mobile device).

Thus, enabling and authentication may both involve the use of device fingerprints established for mobile devices. Each fingerprint may be based on device feature characteristics (e.g., aspects of device hardware or software) and, in some embodiments involving authentication, device use/behavior characteristics (aspects of how the device has been used by the user). It is assumed that, for most devices and their users, at least some of the fingerprint characteristics will vary or change over time, as the device is operated by the user and as software (applets, plug-ins, add-ons, extensions and other software components) are added or changed by the user. Such changes are readily accommodated in the exemplary embodiments, by establishing a threshold of data that needs to be matched when comparing a baseline or reference device fingerprint (e.g., a fingerprint captured initially when the device is enabled) to subsequent fingerprint data captured at the time of the transaction. The threshold may change (e.g., by requiring less data to match) as the number of transactions conducted at the device increases, evidencing greater confidence in reference fingerprint data.

In one described embodiment, device feature characteristics include data pertaining to the device operating system, browser software, and other software (e.g., applications or plug-ins). As an example, device feature characteristics may include operating system characteristics (e.g., operating system name/ID, version, and install date), browser characteristics (e.g., browser name/ID, version, and install date), and other characteristics relating to applications, applets or plug-ins that have been installed (e.g., plug-in name/ID, version, and install date). In one described embodiment, device use characteristics include data resulting from the operation of the device by the user. An example of device use characteristics is data based on logs of recent emails (e.g., aspects or patterns for such emails), logs of recent phone calls made from or received at the device (e.g., aspects or patterns for such calls), and logs of recent websites visited using the browser(s) on the device.

Also in exemplary embodiments, photographic and other personal data associated with a user is captured and used for either enabling the mobile device, for authenticating mobile device transactions, or for both enabling the device and authenticating transactions.

In one embodiment, the personal data may be captured by photographing the user of the mobile device, e.g., either using a camera at an agent location where the device is presented or, alternatively, using a camera built-in or attached to the device. In some embodiments, either in lieu of or in addition to directly photographing the user, the photo (or image) of a user on the photo ID may be captured and used for both enabling a device and authenticating transactions. Also, other personal data (such as a name, social security number or driver's license number) may be captured from a driver's license or other photo ID.

While some described embodiments relate to authenticating consumer-oriented money transfer transactions—money be sent from one user (as a sender) to another user (as a recipient)—other types of transactions may also be authenticated using the features of the present invention. For example, the invention may be employed where the transaction is a retail transaction, e.g., a user of a mobile device is purchasing a product, and the transaction is crediting money or other value to the account of a merchant. As another example, the invention could be employed where a mobile device user wants to perform a transaction not involving the transfer of money or other value, but rather taking an action that could be compromised if an unauthorized person has improperly obtained access to the user device. One such a transaction not involving a money transfer might be the renewal of a passport using a mobile device, where an agent renewing the passport is able to authenticate the user (and his or her device) as the proper passport holder using device fingerprint data, so that the renewed passport is not issued to an imposter.

While some described embodiments illustrate the invention used in connection with a tablet computer (such as an iPad® computer from Apple Inc., Cupertino, Calif.), it should also be appreciated that the features of the present invention could be used in connection with other mobile devices. In its broadest sense, the present invention could be used in communications between any two devices or systems through any communications network, whether using a fixed network (wire line, fiber optic, etc.) or a wireless network (e.g., cellular, radio-based, optical, or infrared based, etc.). As mentioned earlier, the present invention may have particular advantage where one of the users has a mobile device (since such devices may be more easily stolen and used for improper purposes), but such advantages may also be present in the case of user devices that are not mobile and normally used at a fixed location (e.g., a desktop computer).

To better understand the invention through the description of a specific implementation, reference is made to FIG. 1, which is a block diagram illustrating a simplified embodiment of a money transfer system 100. The money transfer system may be operated by a money transfer entity or service provider, such as WESTERN UNION, and may be capable of performing a variety of money transfer transactions from payors to payees. For example, money transfer system 100 may be capable of performing wire transfers and bill payment transactions. Other services may include the ability to issue and reload prepaid stored value cards with funds, and the ability to send gift cards to a party (and reload such cards with funds). A wire transfer may be made from one party to another party, and may involve cash being transferred. Money transfer system 100 may include one or more agent locations 120, one or more websites 140, telephone operator and/or interactive voice response (IVR) systems 150, mobile devices 160, and a money transfer server or host system (MTS) 110.

Agent locations 120 may represent various kiosks and/or other physical locations where payors and payees may conduct money transfer transactions. For example, WESTERN UNION has hundreds of thousands of agent locations scattered worldwide. At agent locations 120, a person, such as a clerk, may serve as a representative of the entity providing the money transfer service. Payors and payees may conduct money transfer transactions by interacting directly with an agent of the money transfer entity at the agent location. Transactions conducted at an agent location may be conducted using a variety of different payment methods. For example, cash, checks, credit cards, debit cards, and stored value cards are all possible methods through which a payment may be received from a payor or provided to a payee. Also, at an agent location, payors and payees may interact directly with a kiosk or terminal that is part of the money transfer system 100. Alternatively, the agent of the money transfer service provider may interact with the kiosk or terminal on behalf of the payor or payee.

Websites 140 allow payors and payees to conduct money transfer transactions via the Internet. A payor may provide payment and transaction information to money transfer system 100 via website 140. For example, a payor may provide bank account information or credit card account information to money transfer system 100 via website 140. The system 100 may access such accounts, maintained at one or more financial institutions 170 (e.g., banks, credit unions, savings and loan associations, and other institutions maintaining accounts), through one or more networks 130. Likewise, payees may receive payment sent via money transfer system 100 via website 140. For example, a payee may provide a bank account number for funds to be deposited at one of the financial institutions 170, via website 140 and network 130. Website 140 may also permit a payor or payee to determine the status of a money transfer transaction. If a payor is conducting the money transfer using a bank account, credit card, stored value card, or using some other payment method besides cash, he or she may be able to conduct the entire payor-side transaction, and subsequently determine it status at any time (pending, completed, funds picked-up, etc.), using the website 140. Likewise, if the payee is receiving the funds via a method other than cash, he may be able to complete his payee-side transaction (and determine its status) using website 140. Alternatively, if either the payor or payee is conducting the transaction in cash, some of the information necessary to conduct the money transfer transaction may be supplied via website 140, with the cash being exchanged at an agent location 120.

Telephone operator and/or IVR system 150 may allow a payor and/or payee to conduct the money transfer transaction via a telephone call to the telephone operator and/or IVR system 150. Payors and payees may provide the information necessary to conduct the money transfer transaction via the telephone, either to a human operator, or to an interactive voice response system. If a payor is conducting the money transfer using a bank account, credit card, stored value card, or using some other payment method besides cash, he may be able to conduct the entire transaction using the telephone operator and/or IVR system 150. Likewise, if the payee is receiving the funds via a method other than cash, he may be able to conduct the entire transaction using the telephone operator and/or IVR system 150. Alternatively, if either the payor and payee is conducting the transaction in cash, some of the information necessary to conduct the money transfer transaction may be supplied via the telephone operator and/or IVR system 150, with the cash being exchanged at an agent location 120.

Also, it may be possible to interact with money transfer system 100 via any one of various mobile devices 160. Mobile devices 160 may represent various wireless devices that can communicate with money transfer system 100. For example, mobile device 160 may include cellular telephones, smart phones, handheld personal communication devices, laptops, tablet computers, etc. Mobile devices 160 may load a website to interact with money transfer system 100. Alternatively, mobile devices 160 may run one or more pieces of software, such as applications or firmware configured to allow interaction with money transfer system 100. Via mobile devices 160, it may be possible for a payor to transmit funds to a payee. Also, it may be possible for a payee to receive funds via mobile devices 160. If a payor is conducting the money transfer using a bank account, credit card, stored value card, or using some other payment method besides cash, he may be able to complete the transaction using one of the mobile devices 160. Likewise, if the payee is receiving the funds via a method other than cash, he may be able to conduct the entire transaction using one of the mobile devices 160. Alternatively, if either the payor and payee is conducting the transaction in cash, some of the information necessary to conduct the money transfer transaction may be supplied via one of the mobile devices 160, with the cash being exchanged at one of the agent locations 120.

Agent locations 120, websites 140, telephone operator and/or IVR system 150, mobile devices 160 and financial institutions 170 may communicate with money transfer host system 110 via the network 130. Network 130 is illustrated as a single network in FIG. 1. This is for simplicity only, since network 130 may include several networks. Further, the network used for agent locations 120 to communicate with money transfer host system 110 may be different from the network used by mobile devices 160 to communicate with money transfer host system 110. The network 130 may include one or more public networks, such as the Internet, and one or more private networks, such as a corporate intranet or a network operated by a banking system (for communications to and from financial institutions 170). Further, multiple networks may be used to communicate with money transfer host system 110. For example, mobile devices 160 may use either a wireless cellular provider's network or the Internet to communicate with money transfer host system 110. The money transfer system may also communicate via network 130 to other external networks and systems, for reasons to be discussed later How a payor provides funds to the money transfer system 100, that is, whether via agent locations 120, website 140, telephone operator and/or IVR system 150, or mobile devices 160, does not necessarily affect how a payee may receive the funds. For example, while a payor may provide funds via website 140, a payee may retrieve the funds via one of agent locations 120. It may also be possible for a payor and payee to use the same entity, such as an agent location 120, to conduct a money transfer transaction.

Money transfer host system 110 may include one or more various subsystems used to complete a money transfer transaction. For example, the system 110 may include a host computer 112 that is configured to execute various software programs for managing money transfer transactions and for managing the communications with each of the agent locations 120, websites 140, telephone/IVR systems 150, mobile devices 160 and financial institutions 170 as described above. The money transfer host system 110 also includes a transaction database 114, a customer database 116 and one or more other database(s) 118.

Transaction database 114 may store and manage information on pending and completed money transfer transactions. Transaction database 114 may identify amounts of funds provided by payors, amounts of funds due to payees, payors' names, payees' names, transaction identifiers such as money transfer control numbers (MTCNs), the locations where the transactions were initiated (e.g., the website, an address of the agent location), the location of where the transaction is expected to be completed (e.g., where the payee is expected to receive the funds), the payor's payment method (e.g., cash, credit card, money order, stored value card, check, etc.), and whether or not various money transfer transactions have been completed or are pending.

Customer database 116 may store and manage biographical and identity information associated with the money transfer service provider's customers (payors and payees). The stored data may include names, addresses, dates of birth, social security numbers, bank account numbers (including financial institution ID/routing numbers), and so forth. Among other things, database 116 may be accessed to collect information that is needed in order to initiate a transaction.

The other database(s) 118 store and manage information useful to the money transfer host in managing transactions and managing various administrative and operational tasks. As examples only, the other databases 118 may store information identifying or relating to each of the agents at agent locations 120, to each of the websites 140, to each of the telephone/IVR systems 150 and to each of the mobile devices 160. The information stored in databases 118 relating to the mobile devices 160 may include device fingerprint data for each of the mobile devices, which will be described in greater detail below. The database(s) 118 may also store information identifying the mobile devices 160 that have been enabled to conduct transactions within system 100.

While databases 114, 116 and 118 are illustrated as separate databases for purposes of generally describing the data stored therein, it should be appreciated that such data could all be housed in a single database, or the data in each may be stored across a much larger number of databases, linked together at either a single location or across number of remote locations. Likewise, while the host computer 112 is illustrated as a single computer system or server, its functions could be performed by a plurality of computers or servers, linked together at either a single location or across number of remote locations.

Figure 2:
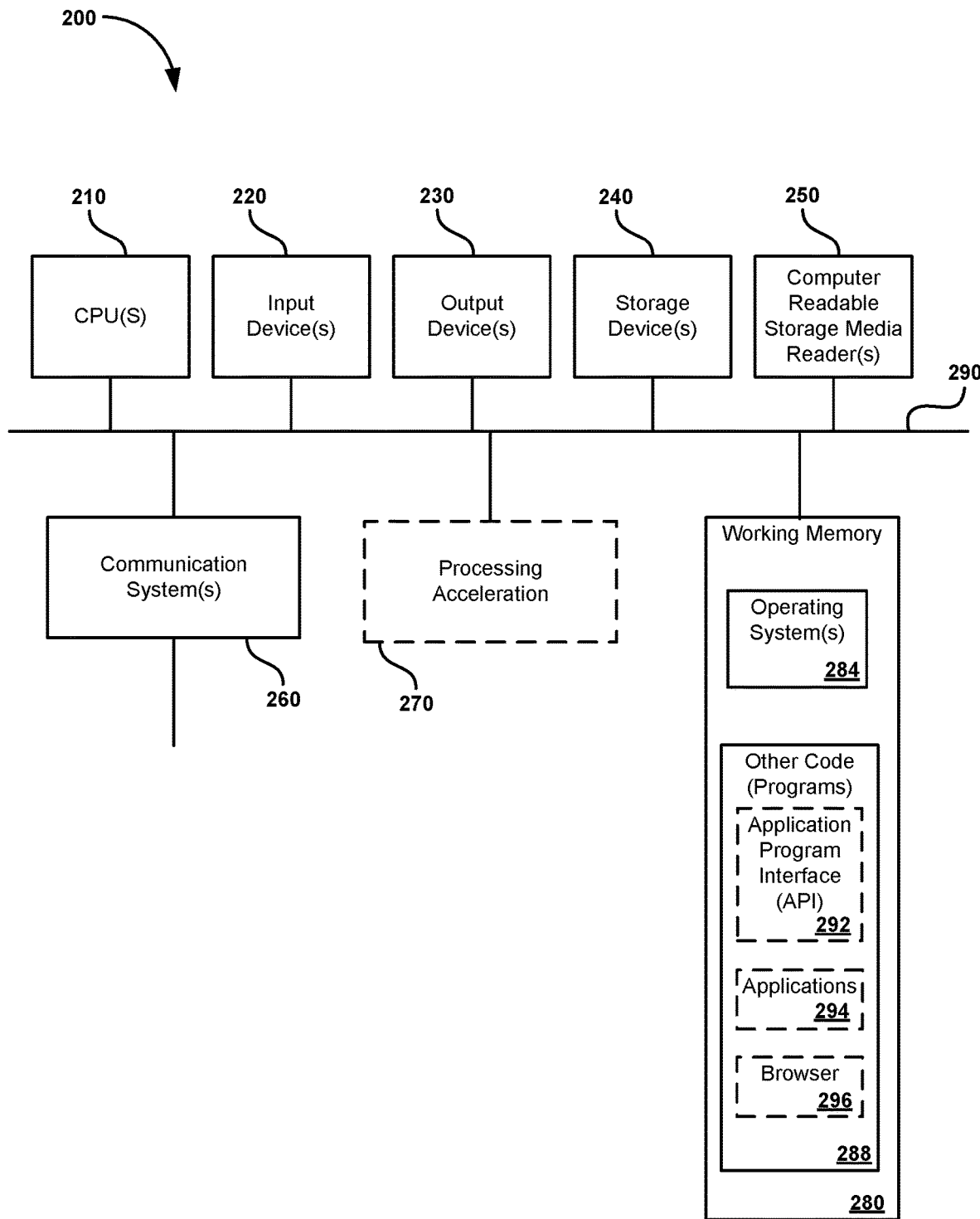
FIG. 2 is a block diagram of a computer system upon which various devices/systems illustrated in FIG. 1 may be implemented.

FIG. 2 is a block diagram illustrating an exemplary computer system upon which embodiments of the present invention may be implemented. This example illustrates a computer system 200 which may be used, in whole, in part, or with various modifications, to provide the functions of the money transfer host system 110, the agent location 120 systems, the systems managing the websites 140, the telephone/IVR systems 150, the mobile devices 160, and/or other components of the invention such as those discussed above.

The computer system 200 is shown comprising hardware elements that may be electrically coupled via a bus 290. The hardware elements may include one or more central processing units 210, one or more input devices 220 (e.g., a mouse, a keyboard, etc.), and one or more output devices 230 (e.g., a display device, a printer, etc.). The computer system 200 may also include one or more storage devices 240, representing remote, local, fixed, and/or removable storage devices and storage media for temporarily and/or more permanently containing computer-readable information, and one or more storage media reader(s) 250 for accessing the storage device(s) 240. By way of example, storage device(s) 240 may be disk drives, optical storage devices, solid-state storage device such as a random access memory ("RAM") and/or a read-only memory ("ROM"), which can be programmable, flash-updateable or the like.

The computer system 200 may additionally include a communications system 260 (e.g., a modem, a network card—wireless or wired, an infra-red communication device, a Bluetooth® device, a near field communications (NFC) device, a cellular communication device, etc.). The communications system 260 may permit data to be exchanged with a network, system, computer, mobile device and/or other component as described earlier. The system 200 also includes working memory 280, which may include RAM and ROM devices as described above. In some embodiments, the computer system 200 may also include a processing acceleration unit 270, which can include a digital signal processor, a special-purpose processor and/or the like.

The computer system 200 may also comprise software elements, shown as being located within a working memory 280, including an operating system 284 and/or other code 288. Software code 288 may be used for implementing functions of various elements of the architecture as described herein. For example, software, stored on and/or executed by a computer system, such as system 200, can thus configure the system 200 to provide the functions of the money transfer host system 110, the agent location 120 systems, the systems managing the websites 140, the telephone/IVR systems 150, and the mobile devices 160.

Also seen in FIG. 2 are specific examples of common software components (application program interface (API) 292, applications 294, and a browser 296) that may resident in the code 288 in several of the systems seen in FIG. 1. The context and use of such common software components in connection with one embodiment of the invention will be described in greater detail below in enabling and authenticating mobile devices 160.

It should be appreciated that alternate embodiments of a computer system 200 may have numerous variations from that described above. For example, customized hardware might also be used and/or particular elements might be implemented in hardware, software (including portable software, such as applets), or both. Furthermore, there may connection to other computing devices such as network input/output and data acquisition devices (not shown).

Figure 3:
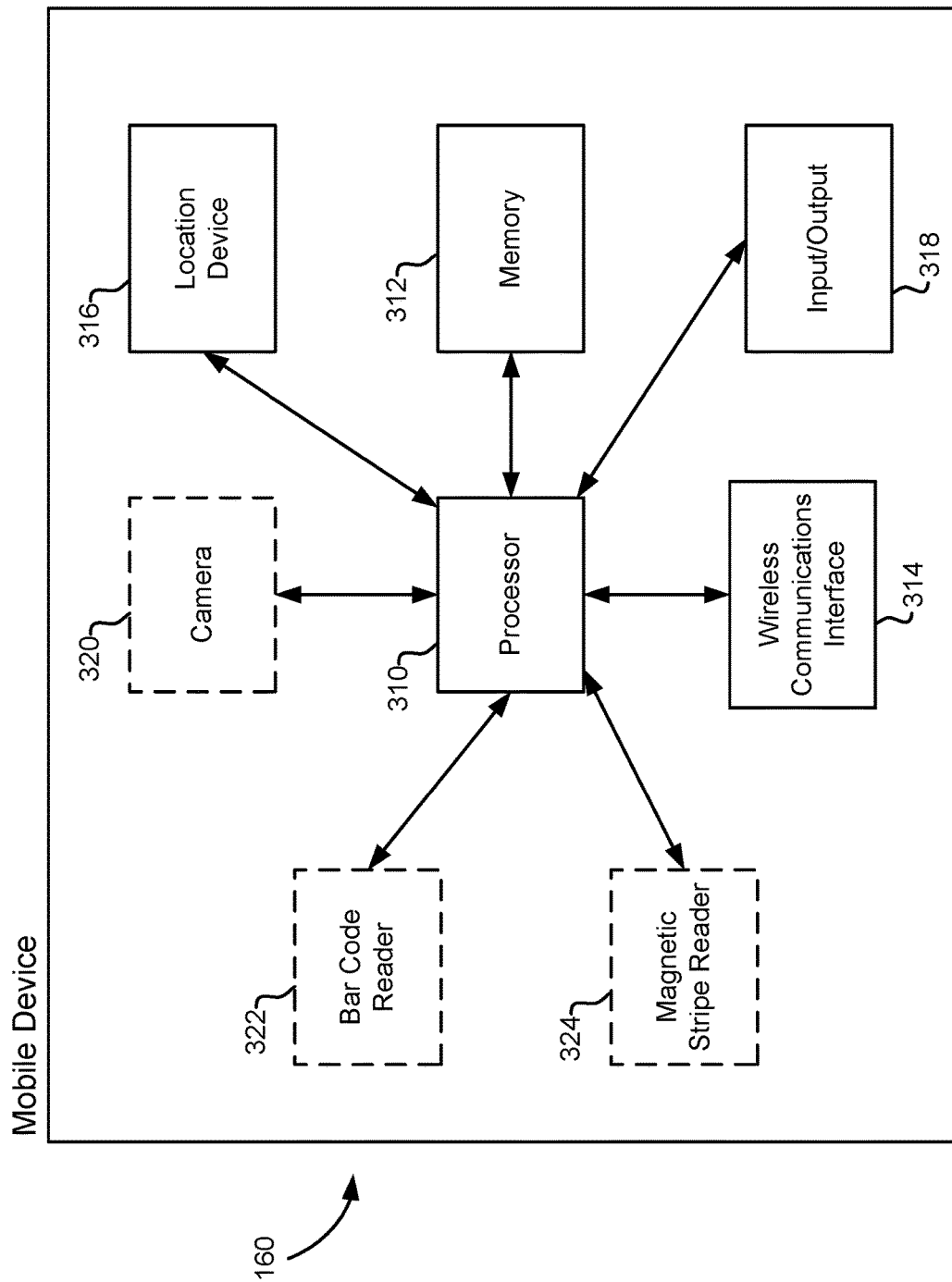
FIG. 3 is a simplified block diagram of a mobile device used in the system of FIG. 1.

FIG. 3 illustrates, in simplified form, the primary functional components of mobile device 160 in one embodiment of the invention. In one embodiment, the mobile device may be a cellular telephone or a mobile computer. It includes a processor 310, a memory 312 for storing programming code and data for use by the processor 310, a wireless communications interface 314, a location device 316, and input/output functions 318 (e.g., display, speaker, microphone, keyboard, etc.). Wireless communications interface 314 could represent more than one interface, such as an interface to a cellular communications network or an interface to a Wi-Fi network. The location device 316 is a GPS or some other form of location determining device. Among other things, the location device provides data indicating the position of the mobile device 160, for use in creating a device fingerprint (to be described later).

The mobile device 160 also includes, or is associated with, a camera 320 (or similar image capturing device), a barcode reader 322 and a magnetic stripe reader 324. These last mentioned components are shown as optionally included at mobile device 160, since in the case of a camera, it may or may not be built into the device (e.g., a cellular phone frequently has a built-in camera), and in the case of a barcode reader and magnetic stripe reader, such components might be external (e.g., at a cellular phone or mobile computer, such components might be connected via an input/out cable). As should be apparent, the camera 320, barcode reader 322 and magnetic stripe reader 324 might be connected to processor 310 through the input/output functions 318, rather than via direct connections as shown. As will be described later, the barcode reader and magnetic stripe reader can be used to capture personal identifying data from a photo ID that stores data in the form of either a barcode or a magnetic stripe.

Also, as will be apparent to those skilled in the art, the mobile device 160 in FIG. 3 is only a simplified illustration of a mobile device that could be used in one embodiment of the invention. While the mobile device could be implemented using the more detailed hardware and software features described in connection with FIG. 2, it will be appreciated that the mobile device 160 may have more, fewer or different components (all well known to those skilled in the art), depending on whether the mobile device is a cellular phone, a personal communications device (iPhone®, Blackberry®, PalmPilot® or similar device) or a mobile computer (laptop computer, notebook computer or a tablet computer such as an iPad®), and also on whether various functions are built-in at the device or are externally connected.

As explained earlier, when either enabling a mobile device 160 for use or authenticating a mobile device 160 for conducting a transaction, two kinds of data may be captured, namely (1) device fingerprint data and (2) personal data. Further, device fingerprint data may be divided into two types or characteristics, namely (1) device feature characteristics or data, and (2) device use characteristics or data.

Figure 4:
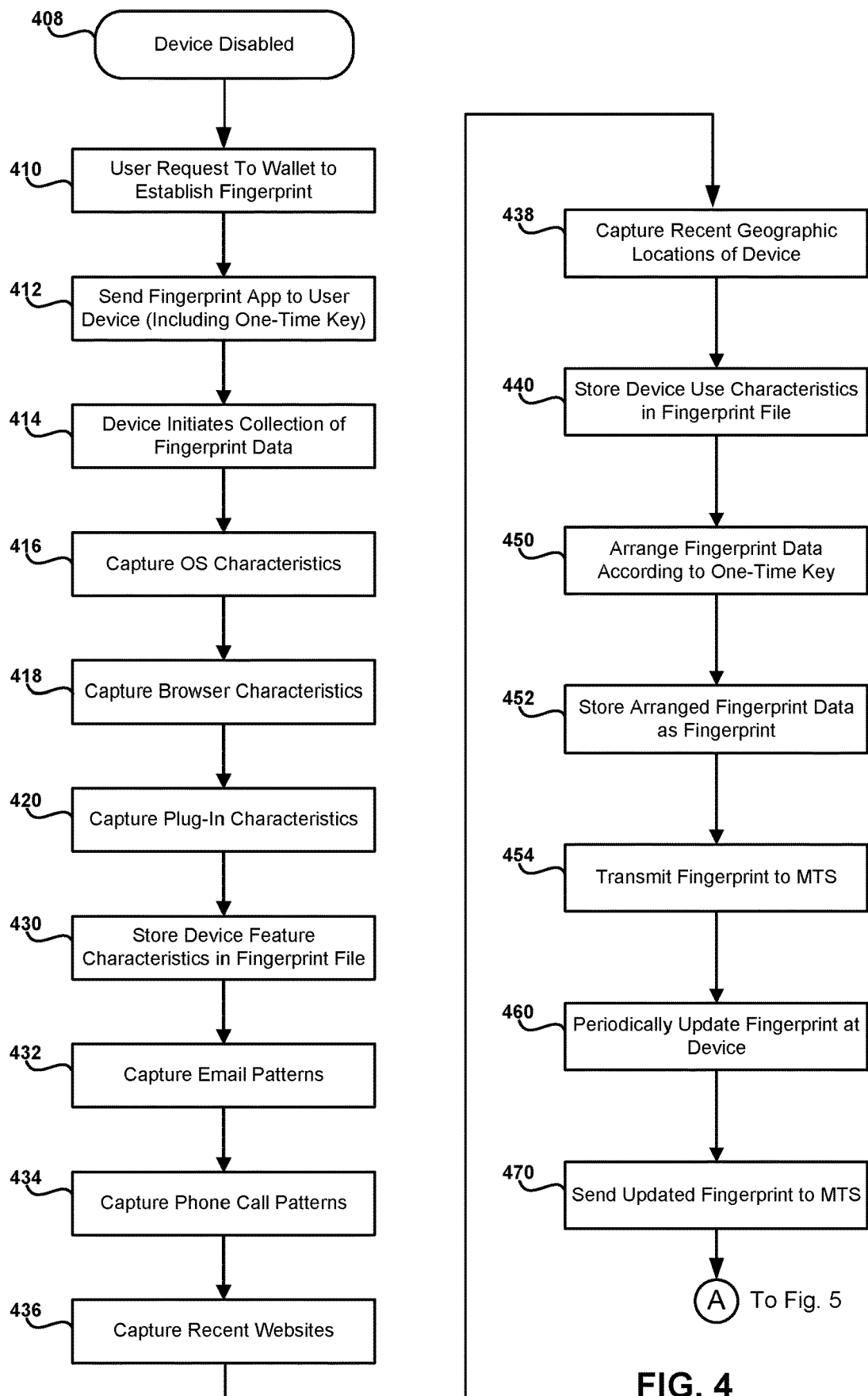
FIGS. 4-6 are flow diagrams of a process for capturing fingerprint and personal data in the system of FIG. 1, and using such data to enable the mobile device to conduct financial transactions.

FIG. 4 illustrates a process for capturing device fingerprint data, e.g., for enabling a mobile device. As will be explained later, a similar process may also be used for capturing device fingerprint data in order to authenticate a transaction using the same device. Initially, the device is not enabled to perform transactions (i.e., it is "disabled"), such condition designated as 408. Regarding this disabled condition, it should be understood that the user may have recently purchased the mobile device, and so the effect of the "disabled" condition will depend on parameters set by the manufacturer or seller of the device. For example, the manufacture (for security purposes) may establish that no operations or transactions of any kind can be performed by the device (other than those necessary to enable the device). In other examples, the manufacturer may permit only certain operations or transactions (for example, telephone calls may be made or emails may be sent, but perhaps for a limited period of time), to ensure that the user may use the mobile device for only limited purposes until it is fully enabled by the user. In most cases, however, the manufacturer will initially disable the device to preclude at least any sensitive transactions, such as financial transactions or applications used to transfer money. It should be appreciated that maintaining the mobile device as completely or partially "disabled' improves security, since the device will have little value to a thief until it is enabled (for example, immediately after purchase, a thief will be less motivated to steal the device knowing that it needs to be enabled and it may have little or no value to the thief until it is enabled).

Also, it should be understood that, although in some exemplary embodiments the device is enabled by "enrolling" the device at the money transfer host system 110, in other embodiments the enabling process could be performed at other locations, e.g., a website or location established by the manufacturer or some other third party. Also, the device could be enabled at the store where purchased, although for enhanced security it would be advantageous for the device to remain disabled until later, after the device is taken home or to some other location away from the store (so that the device would not be seen as valuable in the eyes of a thief immediately after it has been purchased and as it is being carried out of the store).

Also, in describing the process for capturing fingerprint data in FIG. 4, it should be understood that such process might be performed at an agent location 120, with data and software needed for enabling the device being downloaded to the mobile device, for example, through a wired connection (a cable connected between the mobile device 160 and the agent/service provider system) at agent location 120, or if the mobile device 160 has a near field communications capability (or other direct wireless communications capability), wirelessly from the agent/service provider system at agent location 120. In other embodiments, the enabling process can be performed remotely, for example, by the user accessing a website, if the user has the necessary functionality at the mobile device (camera, barcode reader and/or mag stripe reader) to capture the required data (as will be described shortly).

At step 410, the user requests to enroll with the money transfer host system (MTS) 110 (and will establish a fingerprint as part of that enrollment). While not illustrated in FIG. 4 or elsewhere, enrollment also involves collecting or establishing various kinds of information (other than fingerprint data) from the user, such as user ID, device identifier, password, account information and so forth, all of which are known and thus the details pertaining to collection of that other information is not discussed further.

In response to the user's request to enroll, a fingerprint application (such as an applet) is sent at step 412 from the money transfer host system 110 to the mobile device 160.

That application may be sent to the mobile device 160 over a mobile communications network (one of the networks 130). Alternatively, if enrollment takes place at an agent 120 location, the application can be downloaded to the mobile device from the agent/service provider system. The mobile device 160 executes the fingerprint application to initiate the collection or capture of device fingerprint data at the mobile device, step 414.

In the embodiment illustrated in FIG. 4, and as noted earlier, two types of fingerprint data are collected at mobile device 160, namely, (1) device feature characteristics or data (such data is related to "machine" characteristics, rather than operation of the mobile device by its end user, and is collected at steps 416, 418 and 420), and (2) device use characteristics or data (such data is related to the manner in which the mobile device is used or operated by its end user, and is collected at steps 432, 434, 436 and 438).

In order to capture device feature characteristics, the mobile device first executes, at step 416, a call to the operating system 284 within mobile device 160 to retrieve operating system features, such as operating system (OS) name or ID, OS version number and OS install date (such features are typically stored as system properties in the operating system of the mobile device 160 and are updated as the operating system itself is installed or updated). At step 418, a call is made to the operating system within mobile device 160 or directly to the browser 296 to obtain similar information from the browser (browser name or ID, version number and install date). In some cases, more than one browser may be installed and, if desired, information on each browser may be collected. Finally, at step 420 a call is made to the application program interface 292 (which stores identification information on installed plug-ins), where similar information is collected for each application or plug-in installed on the mobile device (plug-in name or ID, version number and install date). As an example, for mobile devices using Java-based operating systems, a Java API resident in system memory typically contains a registry with information on each installed plug-in. While mobile devices used primarily as communications devices may have a limited number of plug-ins (e.g., ten or less), in cases where a larger number have been installed, the fingerprint application could capture data only on the most recently installed plug-ins (say, the most recent ten), since such amount of data would suffice in many cases for purposes of identifying one device over another. After the data is collected at steps 416, 418 and 420, it is stored in a fingerprint file within the memory of the mobile device (step 430). The fingerprint file will be described in more detail later in conjunction with FIG. 10.

After capturing device feature characteristics, the fingerprint application at the mobile device captures device use characteristics including, at step 432, retrieving data from a record or log of recent emails within an email program used at the mobile device. While different types of email logs maybe stored within the email program on mobile device 160 (e.g., sent, received, and deleted), as one example, the emails retrieved are the 50 most recent sent emails, identified by recipient email address. As another example, the fingerprint application could look at a longer list of emails sent (say, the 100 most recent emails), but then sort and capture the ten most frequent recipients in those emails. Other possible categories and numbers of email are, of course, possible.

At step 434, a similar process is used for capturing data for phone calls sent/received at the mobile device (e.g., fifty most recent phone calls sent from the mobile device 160). Then, at step 436, recent websites visited are retrieved from the browser and, at step 438, recent geographical locations (e.g., postal or other location codes) where the mobile device has been located/used are retrieved. As to recent locations, such data could be taken from a record of locations taken periodically over a specified period of time (say one week) based on a GPS application running on mobile device 160. Alternatively, in the case of a mobile device used as a cellular phone, the data could be based on a record of cellular service towers providing wireless service to the mobile device 160, which might be maintained by a mobile network operator and, upon request, downloaded to mobile device 160. Finally, the data captured at steps 432, 434, 436 and 438 is stored in the fingerprint file at the mobile device, step 440.

It should be appreciated that some or all device use characteristics or data (such data is collected at steps 432, 434, 436 and 438) may not be captured during enrollment, depending on the functions that are disabled prior to enrollment as described earlier (e.g., there may be no telephone or email service until enabled). If the mobile device 160 is fully disabled (other than as necessary to enroll the device at the money transfer host system 110), then no device use characteristics will be collected initially, but will be collected later to update the fingerprint and used for transaction authentication purposes.

It should also be appreciated that the categories or types of device feature data and device use data illustrated as captured at steps 416-420 and 432-438 are exemplary, and many other types of data representing device features, uses or operations could additionally, or alternatively, be captured to provide a device fingerprint that is unique to each mobile device 160. As should be apparent, the likelihood that the fingerprint will be unique will increase as more data (and types of data) is captured. As examples only, additional device feature characteristics could include hardware features, other software features, or data from the mobile device SIM (Subscriber Identity Module) card.

The various components of the captured data are then arranged, at step 450, within the fingerprint file according to a one-time key previously provided with the fingerprint application at step 412. In one embodiment, the one-time key may be merely an indication of the order in which the various captured fingerprint data components are arranged in the fingerprint file. In other embodiments, the one-time key may be a public key for a more sophisticated encryption algorithm. One purpose for at least rearranging the fingerprint data components (according to the one-time key) would be to make it more difficult for a person who has possession of the mobile device (such as a thief) to determine the make-up of the fingerprint and use that information to fraudulently create fingerprints that could be used later to conduct fraudulent transactions.

The properly arranged fingerprint data is stored in the fingerprint file and then also transmitted (step 454) to the money transfer host system (MTS) 110. The fingerprint sent to the money transfer host system 110 at step 454 is stored at database 118 and is not only used to enable the device, but also will later be used as a reference fingerprint for comparison in order to authenticate the user and his/her mobile device 160 for conducting transactions. The transmitted fingerprint may also be reviewed at the system 110 to make sure it does not correspond to the fingerprint of a device that has been reported stolen or lost.

Although not needed for enabling the mobile device, the fingerprint application loaded onto the mobile device 160 may also periodically update (e.g., under direction of the fingerprint application) the fingerprint at step 460, essentially repeating the process (e.g., steps 414-452), so that as device feature and device use characteristics change, the fingerprint stored at mobile device 160 is kept reasonably current. Such updated fingerprint will be useful for authenticating transactions.

The updated fingerprint data may be periodically sent to the system 110 (step 470) to update the reference fingerprint, although the frequency of such step (or whether it is even done at all) may depend on the design of the system and desire of the operator of the system 110 as to the degree of variance in fingerprints the money transfer host system will accept in order to authenticate the mobile device 160 when conducting transactions (e.g., if a very close match of a fingerprint is expected in order to authenticate, the updated fingerprint will likely need to be sent frequently to the system 110 for storage in database 118).

Figure 5:
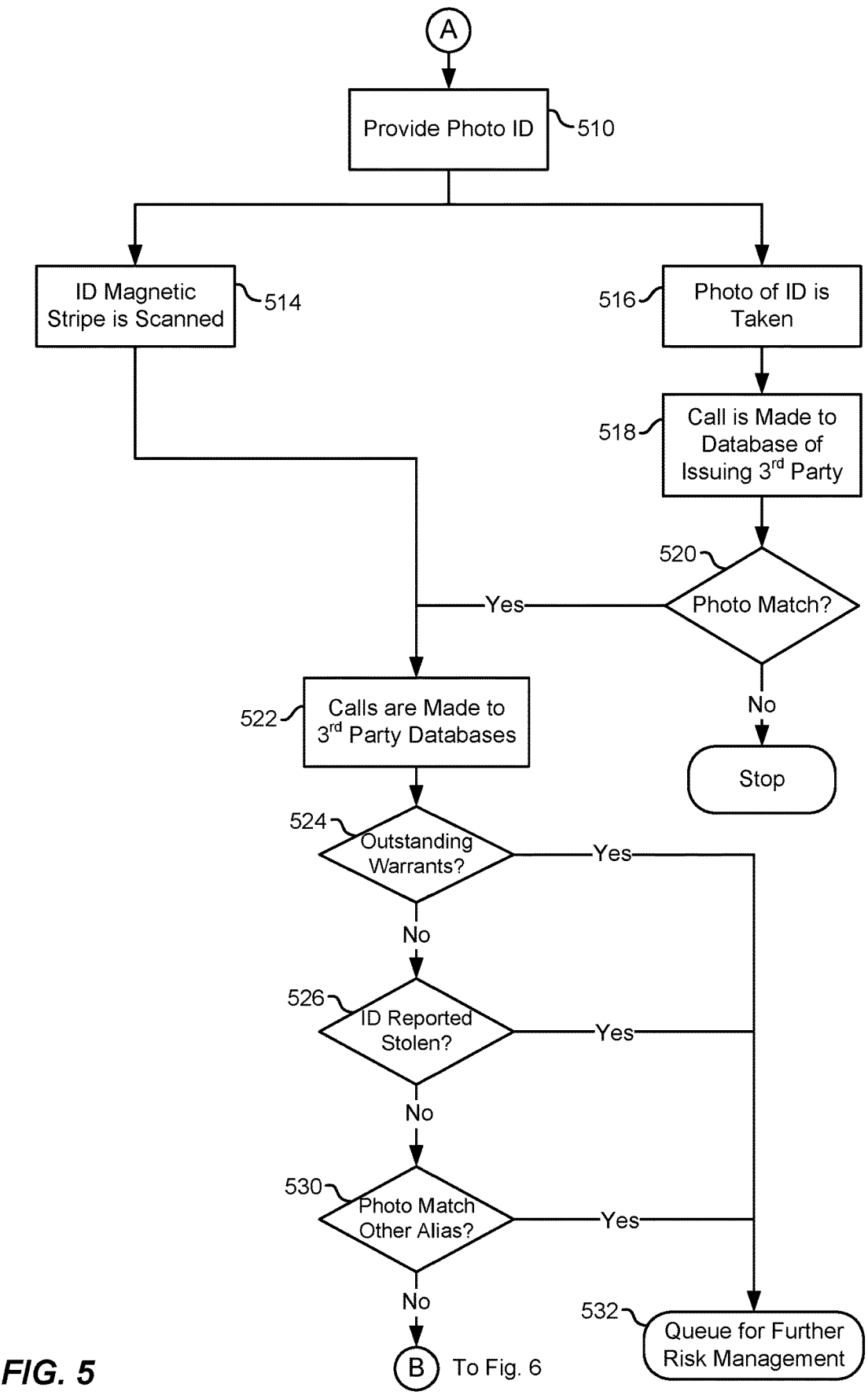

After the fingerprint is sent to the money transfer host system 110 (step 470), the enrollment/enabling process continues with personal data of the user being captured, as illustrated in FIG. 5. The user first provides (step 510) a photo ID card, instrument or document (such as a driver's license) from which data is to be captured. As mentioned earlier, the data may be captured at the mobile device 160 (if it is suitably equipped), or if the user is at an agent location 120, the data may be captured at the system at the agent location. If the photo ID has a magnetic stripe, it is read at step 514, to capture identification information (such as name, driver's license number, social security number, etc.). Alternatively, if the photo ID has a barcode, in addition to or in lieu of the magnetic stripe, such data could also be read by a barcode reader.

At the same time, the ID may be digitally scanned or photographed to electronically capture the photo that is physically on the ID (step 516). A request or call is made (step 518) to an external system of the third party entity issuing the ID (such as an external system operated by a governmental agency, i.e., the relevant driver's license bureau that has a database storing photo data corresponding to each ID). A determination is made as to whether the photo captured photographically from the ID matches the photo maintained in the external database, step 520. If it fails to match, the enabling process stops. Otherwise, the process proceeds to step 522, where requests or calls are made to various third party databases in order to examine the identification information captured at step 514 and the photo data captured at step 516. For example, a database containing criminal records can be accessed to determine if there is an outstanding warrant for the person whose identification data has been captured (step 524). A database with information on stolen IDs can be accessed to determine if the ID corresponding to the captured identification information has been reported stolen (step 526). Finally, the photo captured at step 516 is checked against other photo databases (e.g., external databases and systems other than the one issuing the photo ID), where the captured photo is compared to determine if it matches a name or alias different than that given by the user during the enrollment/enabling process (step 530). If issues arise out of steps 524, 526 and 530, the enabling process may be subject to further risk analysis (step 532), e.g., by a human analyst, to analyze the data and determine whether potential fraud is involved. Otherwise the personal data collection process continues (to the steps illustrated in FIG. 6).

Figure 6:
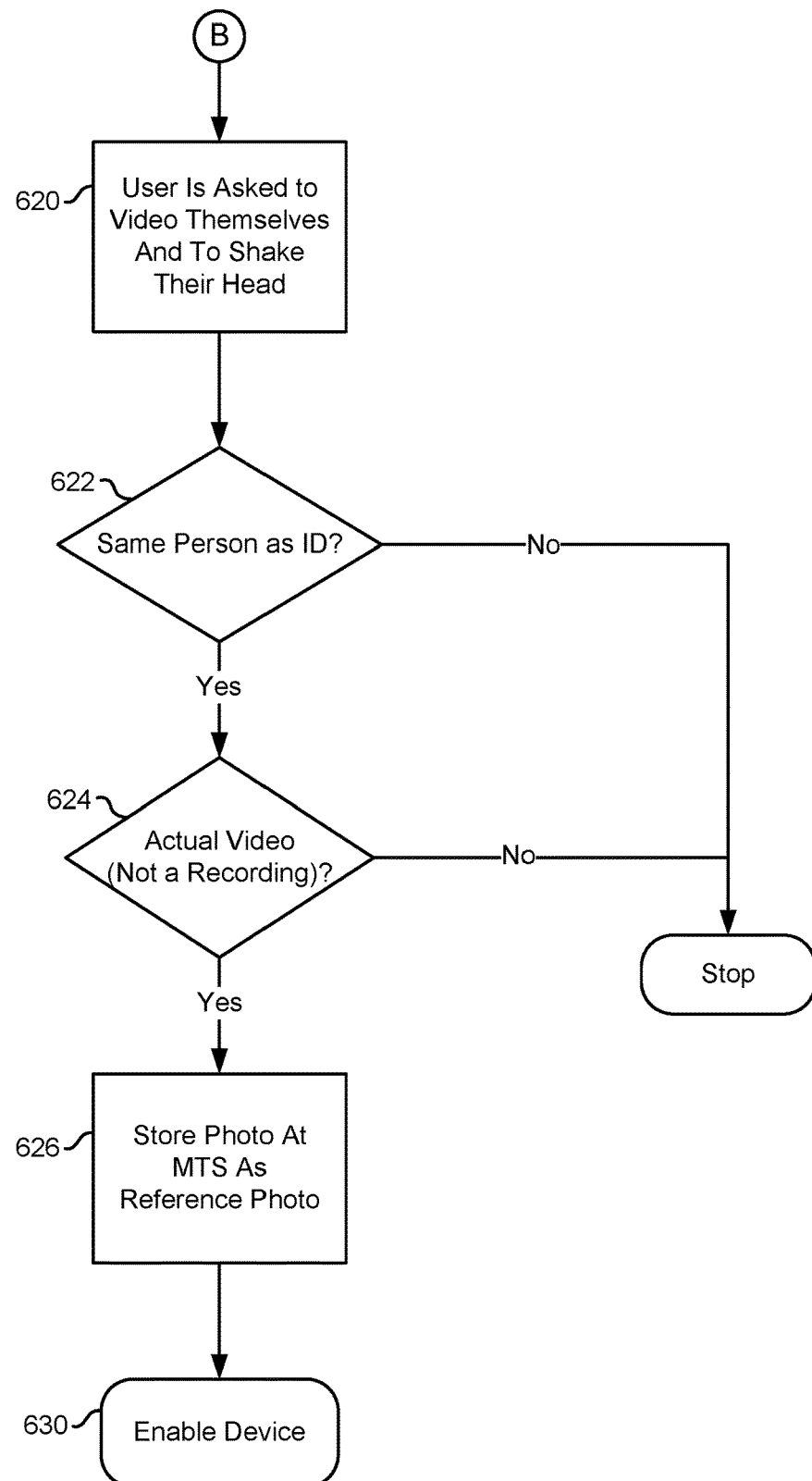

Before proceeding to FIG. 6, it should be appreciated that the analysis of photos (e.g., steps 520 and 530) can be accomplished using well know facial recognition and comparison systems which are commercially available. Such systems use a variety of well know techniques, such as those available in systems sold by Animetrics, Inc, Identix Inc., Google Inc. (Picasa), Apple Inc. (iPhoto) and others.

Referring to FIG. 6, the user is then asked to capture a video (live image) of himself or herself (step 620) at a camera at the mobile device 160 or at the agent location 120, for comparison to the earlier captured photo at step 516. The user will be prompted to move his/her head (e.g., side to side) to make sure that the video is not merely the earlier captured photo or another photo taken of the subject. A comparison is made (step 622) and if the person in the video is the same person as in the photo ID, the system checks to make sure the time stamp on the video is live and current and not an earlier recording (step 624). If the video/photo ID do not match or the system detects it is receiving an earlier recorded video rather than a live video, the enabling process is stopped. Otherwise, the initially captured photo from the photo ID is stored at the money transfer host system 110 as a reference photo (step 626), and the mobile device is now fully enabled by the system 110 (step 630).

Figure 7:
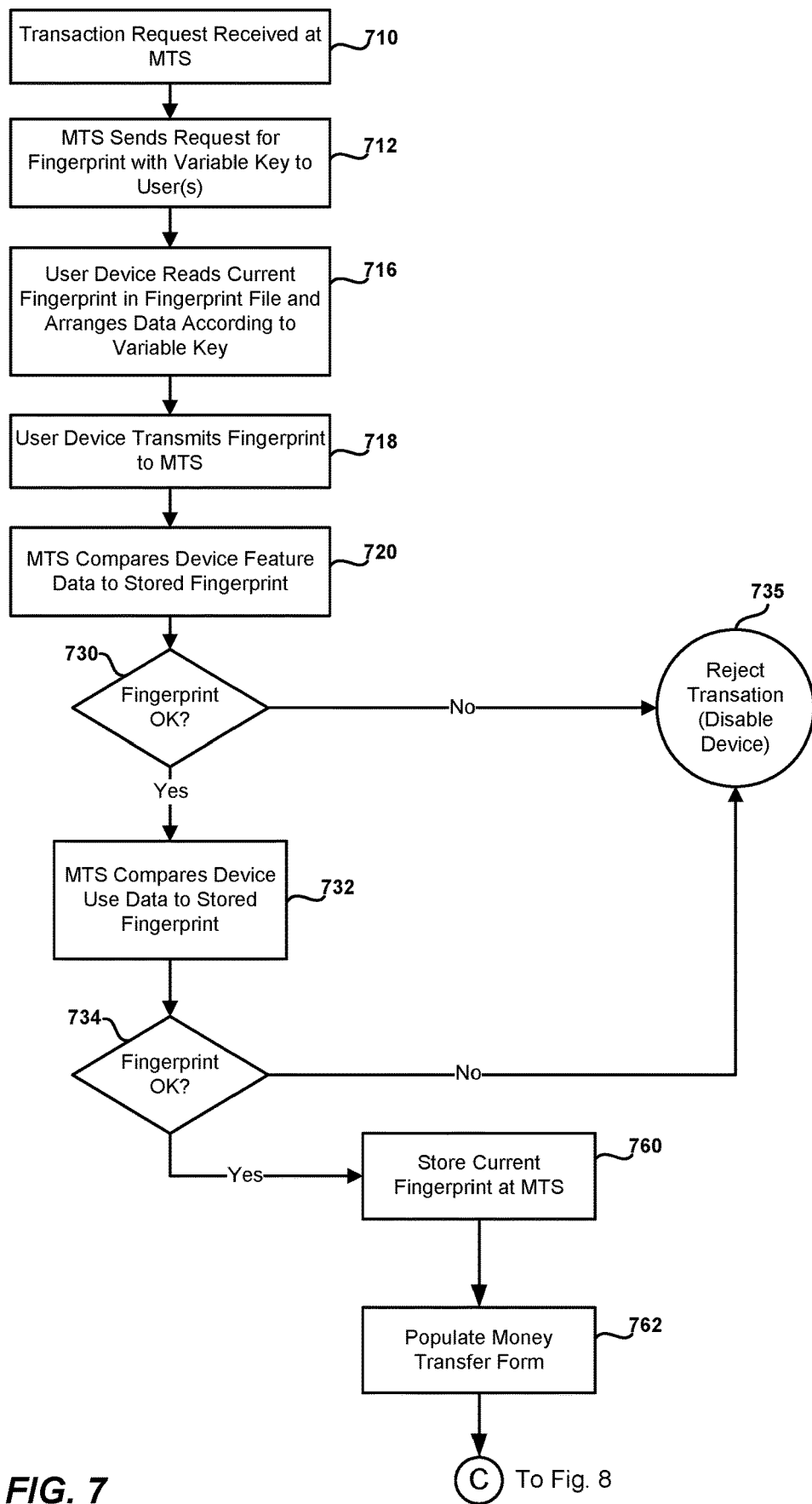
FIGS. 7-9 are flow diagrams of a process for authenticating a device and its user based on fingerprints and personal data captured as part of a transaction request in the system of FIG. 1.
Figure 8:
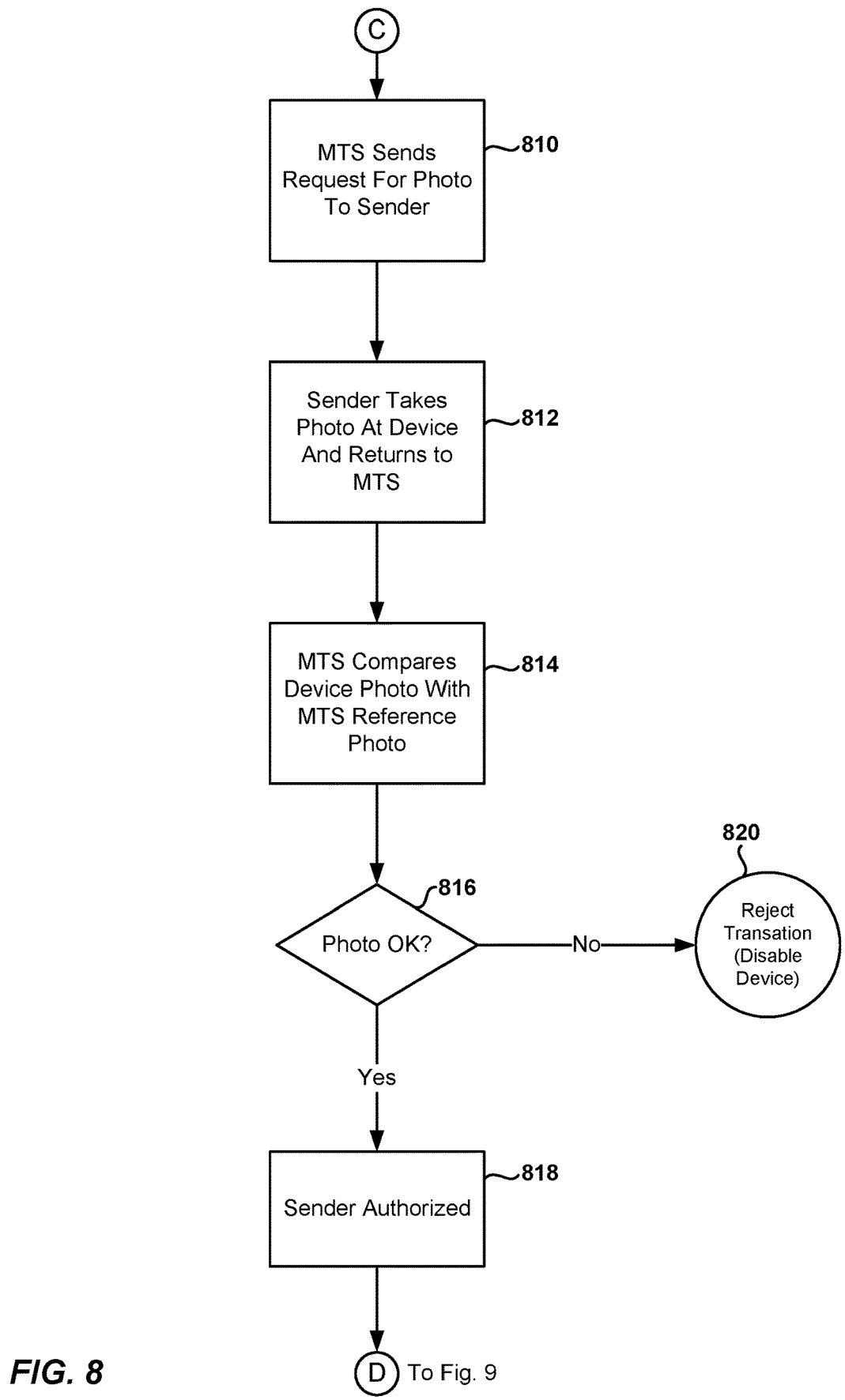
Figure 9:
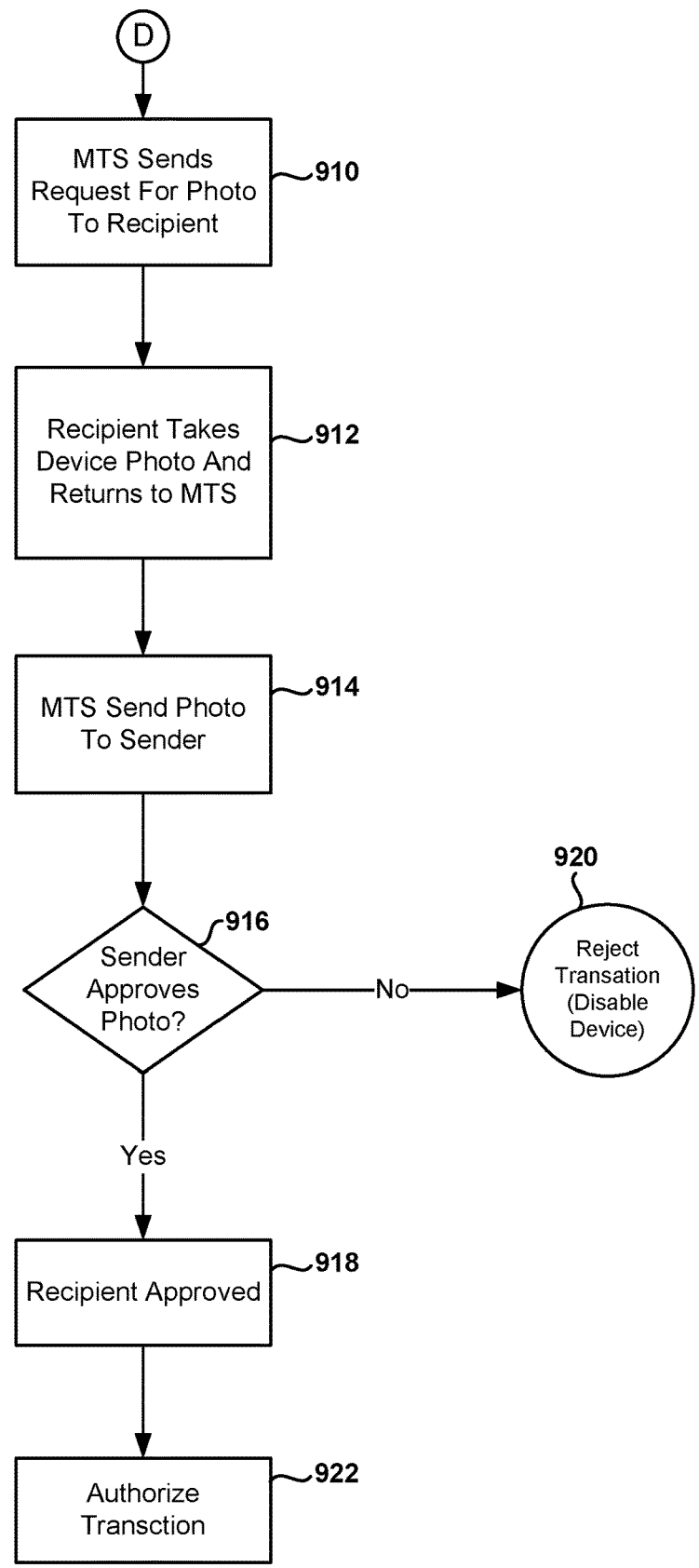

FIG. 7 through 9 illustrate the use of fingerprint data and personal data (e.g., the photograph captured at step 516) for authenticating a user and a transaction to be conducted at the mobile device 160, implemented by programs executed at the mobile device 160 and the money transfer host system 110 (it is assumed for such authentication that the mobile device has been earlier enabled at step 630).

Turning to FIG. 7, there is illustrated an exemplary flow or process for authenticating a device fingerprint as part of processing a transaction request made by a user at the mobile device 160. At step 710, a request (such as for a money transfer transaction) is received at money transfer host system (MTS) 110, and in response the host computer 112 returns a request for a device fingerprint from the user at the mobile device, step 712. The request from the host 112 to the mobile device 160 may include an encryption key, which is variable (i.e., it may vary or change for each request), that is used to rearrange the fingerprint stored in the fingerprint file of the mobile device (step 716) prior to being sent to system 110. As with the one-time key used to initially store the fingerprint at the mobile device 160 (steps 450, 452), the variable key may be merely an indication of the order in which the various fingerprint data is to be arranged for transmission to the system 110. Alternatively, the variable key may be a public key for a more sophisticated encryption algorithm, for encrypting the fingerprint data prior to transmission. In either case, one purpose of rearranging or encrypting the fingerprint data components (according to the variable key) would be to make it more difficult for a person (who may improperly intercept the return of the fingerprint to the system 110) to later use the fingerprint to conduct fraudulent transactions using that fingerprint.

The encrypted fingerprint from the mobile device 160 is returned to the system 110 at step 718, where it is compared to the reference fingerprint for the same device that is stored at database 118. As seen in FIG. 7, the fingerprint comparison may be done in two stages, with a comparison first made at step 720 of device feature data or characteristics (e.g., operating system, browser and plug-in characteristics), and then a comparison of device use data or characteristics (e.g., email patterns, phone call patterns, visited websites and location patterns). The advantage of separating the comparisons of device features and device uses is that a lack of a good match for device features may indicate a significant change to the device, such as may result from the device being stolen. For example, in some cases, a thief may change an operating system, swap out email programs and make similar basic changes to the device in order to use the device for fraudulent transactions. Evidence of such changes may give rise to a higher level of concern about the device having been stolen. On the other hand, device use changes may be indicative of normal changing patterns of use by the same user. For example, if a user has changed jobs or had some other change in personal circumstances, the pattern of uses of the user's mobile device may correspondingly change. The operator of the money transfer host system 110 may thus desire to distinguish between changes in device features and changes in device uses, particularly if the operator is aware of changes in personal circumstances. In some embodiments, a system operator may permit fewer variances (or no variances at all) in device features when deciding if there is a match of fingerprint device features characteristics (step 730).

It should be appreciated that the process in FIG. 7 assumes that there has been some use of the mobile device 160 after it has been enabled (step 630) and thus there has been some use data established at the mobile device, and that such use data may have been updated (step 460). Further, in evaluating variances that may be detected at step 732, the operator/service provider at system 110 may permit more variances in device use characteristics when deciding if there is a match of fingerprint device use characteristics (step 734). In either case, if the match fails, the transaction is rejected and the device may be disabled, at least for purposes of the transaction (step 735). Other steps could be taken, such as an email to the user at the last authorized email address, an alert to authorities of the possible fraudulent activity, and other mitigating actions (an audit of recent transactions, notifying the user's financial institution for possible follow-up, etc.).

In some embodiments, the comparison of fingerprint data may be done as a single step without separately comparing device feature characteristics and device use characteristics as illustrated in FIG. 7.

It should be noted that, in some cases, the comparison of fingerprint data at the system 110 is more quantitative (e.g., variances of more than a certain amount, such as 10%, in one or more categories of device uses could indicate that the compared fingerprints are not the same or not matched). In other cases the comparison may be more qualitative or a combination of quantitative and qualitative. One embodiment using a quantitative approach will be described later in conjunction with FIG. 11.

Also, some characteristics may be given more weight than others, and the comparisons may relate to patterns of fingerprint components rather than individual components. As one example, the area codes of phone calls can be compared, and if the fingerprint sent from the mobile device shows a pattern of calls to suspicious area codes never before seen in a fingerprint at the wallet, fewer variances from past activity may be acceptable. As another example, if the locations (captured at step 438) sent as part of a fingerprint from the mobile device evidence a stable past pattern with a sudden, dramatic change from the pattern (e.g., prior uses confined to certain states in the US, and then the updated fingerprint from the mobile device reflecting use of the device in a foreign country), such a variance in itself may be sufficient reason to disable the device. Many other methodologies and algorithms for comparing individual fingerprint components or patterns of components could be used is addition to or as alternatives to those described herein, depending on the design of the system and the degree of certainty (risk avoidance) desired by the operator of the money transfer host system 110.

At step 760, if the fingerprint sent by the mobile device 160 is authenticated, it may be stored at database 118 (as an updated reference fingerprint), and used in subsequent transactions for authentication. Alternatively, if desired by system 110, at step 762 various personal data captured (e.g., data from using a mag stripe reader on a photo ID at step 514) can also be used to automatically access personal data of the customer (e.g., from the database 116) and then populate a money transfer form required by the operator of system 110, e.g., at least some of the personal information for the sender that is needed by the system 110 in order to compete a money transfer transaction.

The process then proceeds to steps illustrated in FIG. 8, where personal data (e.g., a photo) may also used to authenticate the transaction. The money transfer host system (MTS) 110 send a request (step 810) to the mobile device 160 for the sender to capture a current photo at the mobile device (such as by using a camera built-in at the mobile device. Alternatively, the photo could be taken at a agent location 120. The sender takes the photo and returns it to the system 110, step 812. At step 814, the system 110 compares that photo to the reference photo/image earlier stored during the enrollment/enabling process at step 626. If the photo matches, the sender and his transaction is authorized (step 818). If it does not match, the transaction is rejected (step 820) and the device may be disabled (at least for purposes of the present transaction).

In embodiments where the recipient of a money transfer is also using a mobile device 160 for a transaction, a process shown in FIG. 9 may be used to authorize the recipient (thus requiring both the sender as well as the recipient to be authorized prior to completing a money transfer). At step 910, the system 110 requests a photo from the recipient. The recipient takes the photo at his/her mobile device 160 and sends it to the system 110, step 912, where it is in turn sent to the sender at step 914. If the sender approves or recognizes the photo as being the intended recipient (step 916), the recipient is approved for purposes of the transaction (step 918) and the system then authorizes/authenticates the transaction as to both the sender and the recipient (step 922).

While not illustrated in FIG. 9, the system 110 may check the digital time stamp on the photo to make sure it is a photo that has been taken at the time of the transaction (rather than an earlier photo surreptitiously obtained, e.g., by a thief, and being used to impersonate the recipient).

Figure 10:
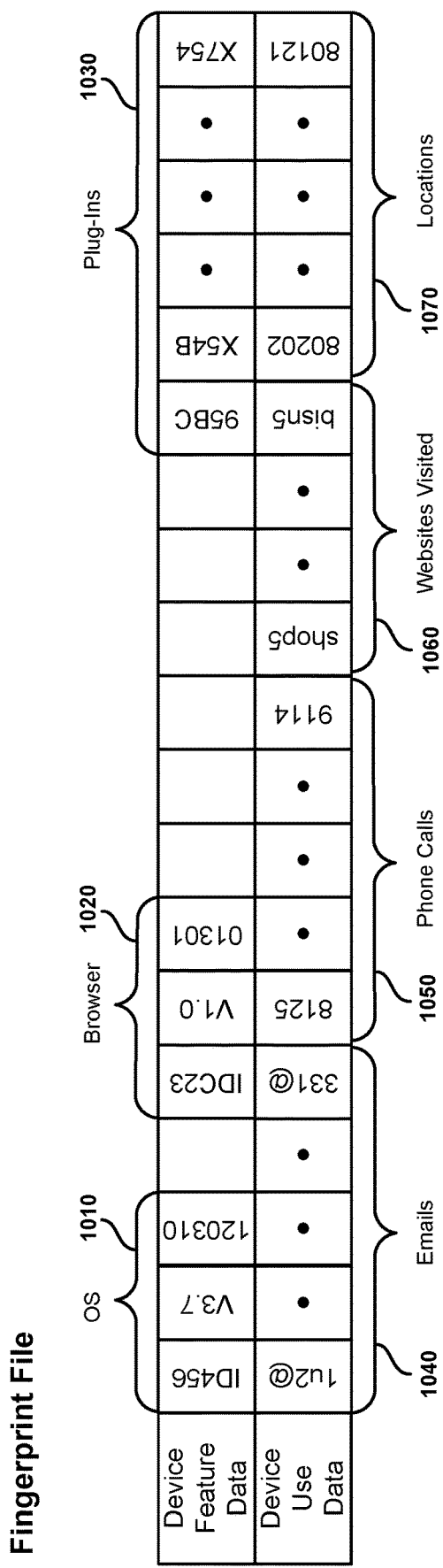
FIG. 10 illustrates a fingerprint file populated with fingerprint data, in a mobile device of the system of FIG. 1.

FIG. 10 illustrates an example of a fingerprint file (and the components of the fingerprint data) captured and stored at a mobile device using the exemplary process illustrated in FIG. 4.

As illustrated, the fingerprint file stores device feature data or characteristics, such as an operating system (OS) data 1010 (OS ID, OS version/release number, and OS install/release date), and browser data 1020 (browser ID, browser version/release number, and browser install/release date). The fingerprint file also includes IDs 1030 for each of the plug-ins installed on the mobile device 160. Although not illustrated, mobile devices often store install dates for each installed plug-in (time-stamped at the time of installation) and that data could also be captured and stored in the fingerprint file.

The fingerprint file also stores device use data or characteristics, such as email data 1040 (e.g., identifying portions of email addresses), phone calls 1050 (e.g., some or all digits of numbers called), visited websites 1060 (e.g., website IP address), and locations 1070 where the mobile device has been located or used over a given period of time (e.g., postal codes, location IDs, etc.).

While fingerprint file data illustrated in FIG. 10 is the data stored in memory at the mobile device 160, such data may also represent the fingerprint sent (and periodically updated) as a reference fingerprint to system 110 and stored in database 118. The illustrated data is exemplary only, and as mentioned earlier, an actual fingerprint may have less data, more data or different data that that shown. Also, such data in the fingerprint file may be re-arranged or scrambled (based on the one-time key mentioned in conjunction with step 412) in an order other than that shown.

Figure 11:
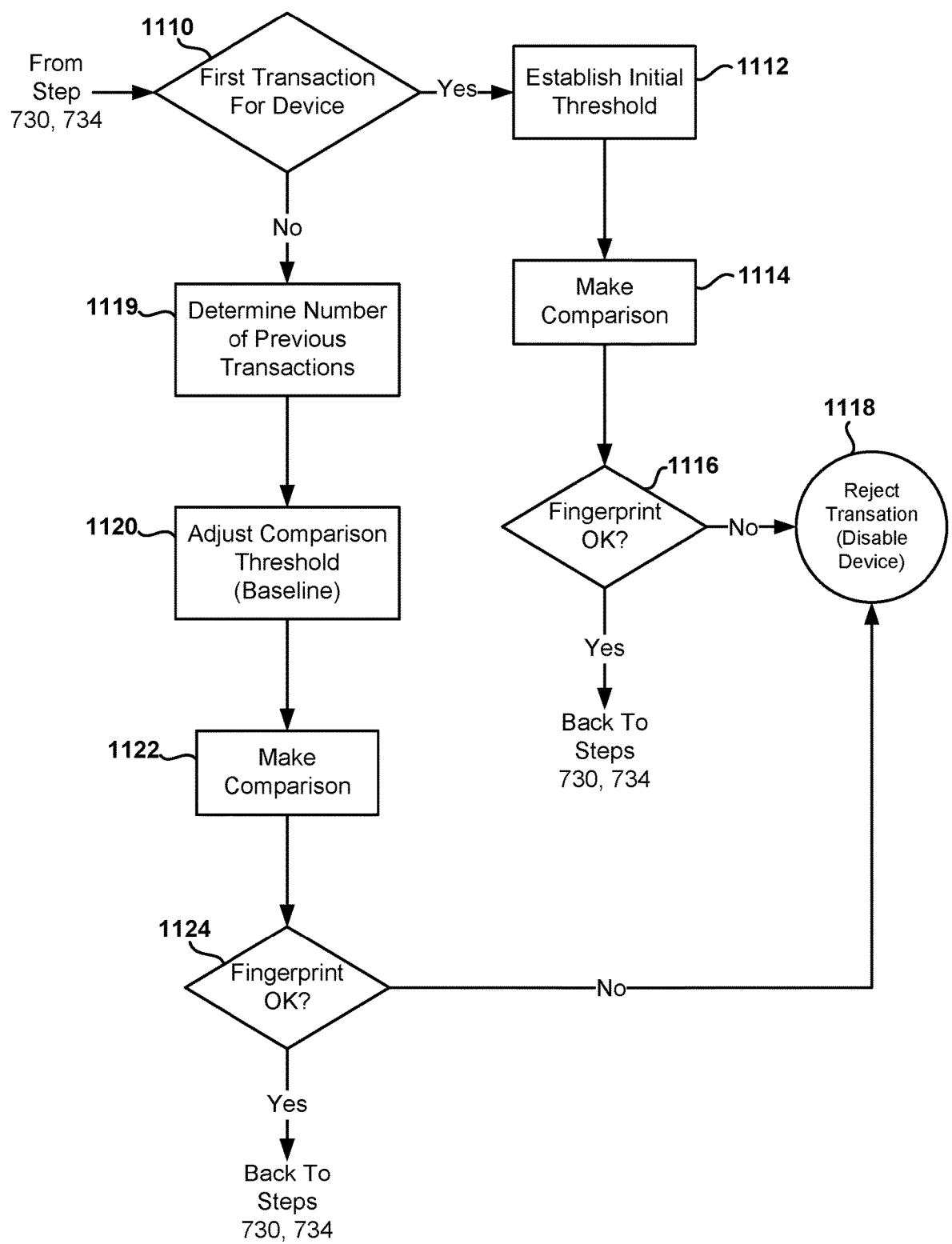
FIG. 11 is a flow diagram illustrating a process for establishing a threshold for comparing fingerprint data to reference data in order to authenticate a transaction.

In some embodiments, the system 110 is configured to develop confidence in and accept (as matched) fingerprints sent by mobile device 160 for comparison to the reference fingerprints stored at database 118, even with some changes or variations in fingerprint data over time. This is illustrated in the process of FIG. 11, which may augment or be used in the fingerprint comparison steps 730 and 734 in FIG. 7. In particular, and as part of the comparison steps, the system 110 first determines whether the money transfer transaction being requested is the first such transaction for the mobile device 160, at step 1110. If it is, an initial threshold is established (step 1112) for the comparison (that initial threshold is high, requiring an exact or very close match to approve a fingerprint sent by the mobile device). The comparison to the initial threshold is made at step 1114 and if the fingerprint matches (step 1116), the process returns to either step 730 or step 734 (and then proceeds on to either step 732 or step 760) in FIG. 7. If the fingerprint does not match, the transaction is rejected (step 1118), and the device may be disabled, at least for purposes of the transaction.

If the transaction being requested is not the first transaction, the system 110 determines the number of previous transactions conducted at the mobile device 160 (step 1119), and the threshold is adjusted based on that number of previous transactions, to establish a lower threshold or baseline for the comparison (step 1120).

Turning briefly to FIG. 12, there is illustrated in simplified form one embodiment where the comparison thresholds are adjusted. In this embodiment, the comparison thresholds (and degree of the match that is needed) start high. As illustrated, a near exact match of 99% is required for the initial transaction, the threshold is lowered slightly for the next four transactions (transactions 2-5), and then the threshold is lowered further (to 80%) thereafter.

As should be apparent, the illustration in FIG. 11 is simplified and exemplary only. As mentioned earlier, each threshold may be multi-faceted, with the actual threshold at each transaction number being a composite of component thresholds, each component corresponding to a different component of the fingerprint. The threshold may also be based on other methodologies. In some cases the threshold may even be raised after the initial transaction (e.g., if significant time has elapsed since the last transaction).

Returning to FIG. 11, once the threshold has been adjusted at step 1120, a comparison is made of the fingerprint data transmitted from the mobile device 160 and the reference fingerprint stored at database 118 of system 110, step 1122. If the transmitted fingerprint matches, using the adjusted threshold, the fingerprint is approved (step 1124) and the process returns to either step 730 or step 734 (and then proceeds on to either step 732 or step 760) in FIG. 7. If the fingerprint does not match at step 1124, the transaction is rejected (step 1118).

While the invention has been described with respect to exemplary embodiments, one skilled in the art will recognize that numerous modifications are possible. As examples only, while database 118 is described as keeping only a single fingerprint for each device (e.g., the most recently updated fingerprint sent from the mobile device 160), the database 118 may, alternatively, store multiple fingerprints representing a historical record or log of fingerprints, with comparisons made against all such historical fingerprints (and the trend or pattern of such fingerprints), which may result in more accurate authentication. Further, while the mobile device 160 is described as storing the device fingerprint (either initially or as updated, steps 452 and 460), the mobile device may alternatively capture a fingerprint "on the fly," e.g., at the time each transaction is requested at the mobile device. Also, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention.

Moreover, while the various flows and processes described herein (e.g., those illustrated in FIGS. 4-9 and 11) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for configuring devices to conduct transactions, the system comprising:
   a processing unit comprising one or more processors; and
   memory readable by the processing unit and storing therein a set of instructions which, when executed by the processing unit, causes the system to:
      receive and store reference fingerprint data associated with a first device, wherein the reference fingerprint data comprises:
         reference device usage data corresponding to operation of the first device by a user of the first device at a first time, wherein the reference device usage data comprises one or more of an email log or a cellular communication log; and
         reference device feature characteristics comprising a software feature and a hardware feature of the first device at the first time;
      receive a request to enable the first device to conduct a transaction;

receive current fingerprint data associated with the first device, wherein the current fingerprint data comprises:
  current device usage data corresponding to operation of the first device by the user of the first device at a second time, wherein the current device usage data comprises one or more of an email log or a cellular communication log; and
  current device feature characteristics comprising a software feature and a hardware feature of the first device at the second time;
determine a number of previous transactions performed by the first device;
retrieve a matching threshold from the memory of the system based on the number of previous transactions performed by the first device;
compare the reference fingerprint data associated with the first device to the current fingerprint data associated with the first device using the matching threshold;
verify the current fingerprint data of the first device based on the matching threshold; and
in response to verification of the current fingerprint data, enable the first device to conduct a transaction.

2. The system of claim 1, wherein:
the memory of the system stores a plurality of matching thresholds associated with a plurality of different devices; and
the retrieved matching threshold is associated with the first device.

3. The system of claim 1, wherein the retrieved matching threshold is associated with the first device, and wherein the memory stores additional instructions which, when executed by the processing unit, causes the system to:
decrease the matching threshold associated with the first device in the memory of the system, in response to the first device conducting a transaction.

4. The system of claim 1, wherein the retrieved matching threshold is associated with the first device, and wherein the memory stores additional instructions which, when executed by the processing unit, causes the system to:
increase the matching threshold associated with the first device in the memory of the system, based on an amount of time having passed since a previous transaction conducted by the first device.

5. The system of claim 1, wherein the memory stores additional instructions which, when executed by the processing unit, causes the system to:
in response to the first device conducting a transaction, update the reference fingerprint data associated with the first device, wherein the current fingerprint data is used to update the reference fingerprint data.

6. The system of claim 1, wherein the memory stores additional instructions which, when executed by the processing unit, causes the system to:
receive a second request to enable the first device to conduct a transaction;
receive updated current fingerprint data associated with the first device, wherein the updated set of current fingerprint data is received concurrently with or subsequent to the second request to enable the first device to conduct a transaction;
perform a second comparison between the reference fingerprint data associated with the first device, and the updated current fingerprint data associated with the first device; and
disable the first device from conducting a transaction, based on the results of the second comparison between the reference fingerprint data associated with the first device, and the updated current fingerprint data associated with the first device.

7. The system of claim 1, wherein the matching threshold is further based on a composite of component thresholds, the component thresholds comprise a device usage data threshold and a device feature characteristics threshold.

8. The system of claim 1, wherein at least one of the reference device usage data and the current device usage data corresponds to characteristics of web sites visited by the user via the first device.

9. A method of configuring devices to conduct transactions, the method comprising:
receiving and storing, by a host computer system, a reference fingerprint data associated with a first device, wherein the reference fingerprint data comprises:
  reference device usage data corresponding to operation of the first device by a user of the first device at a first time, wherein the reference usage data comprises one or more of an email log or a cellular communication log; and
  reference device feature characteristics comprising a software feature and a hardware feature of the first device at the first time;
receiving, by the host computer system, a request to enable the first device to conduct a transaction;
receiving, by the host computer system, current fingerprint data associated with the first device, wherein the current fingerprint data comprises:
  current device usage data corresponding to operation of the first device by the user of the first device at a second time, wherein the current device usage data comprises one or more an email log or a cellular communication log; and
  current device feature characteristics comprising a software feature and a hardware feature of the first device at the second time;
determining, by the host computer system, a number of previous transactions performed by the first device;
retrieving, by the host computer system, a matching threshold associated with the first device based on the number of previous transactions performed by the first device;
comparing, by the host computer system, the reference fingerprint data associated with the first device to the current fingerprint data associated with the first device using the matching threshold;
verifying the current fingerprint data of the first device based on the matching threshold; and
in response to verification of the current fingerprint data, enabling, by the host computer system, the first device to conduct a transaction.

10. The method of claim 9, further comprising:
storing a plurality of matching thresholds associated with a plurality of different devices, and wherein the retrieved matching threshold is associated with the first device.

11. The method of claim 10, wherein the retrieved matching threshold is associated with the first device, and wherein the method further comprises:
decreasing the matching threshold associated with the first device in response to the first device conducting a transaction.

12. The method of claim 10, wherein the retrieved matching threshold is associated with the first device, and wherein the method further comprises:
increasing the matching threshold associated with the first based on an amount of time having passed since a previous transaction conducted by the first device.

13. The method of claim 10, further comprising:
in response to the first device conducting a transaction, updating the reference fingerprint data associated with the first device, wherein the current fingerprint data is used to update the reference fingerprint data.

14. The method of claim 9, further comprising:
receiving a second request to enable the first device to conduct a transaction;
receiving updated current fingerprint data associated with the first device, wherein the updated current fingerprint data is received concurrently with or subsequent to the second request to enable the first device to conduct a transaction;
performing a second comparison between the reference fingerprint data associated with the first device, and the updated current fingerprint data associated with the first device; and
disabling the first device from conducting a transaction, based on the results of the second comparison between the reference fingerprint data associated with the first device, and the updated current fingerprint data associated with the first device.

15. One or more processor readable non-transitory computer-readable storage media that includes instructions, which when executed by at least one processor, cause the at least one processor to perform a set of acts, the set of acts comprising:
receiving and storing, by a host computer system, a reference fingerprint data associated with a first device, wherein the reference fingerprint data comprises:
reference device usage data corresponding to operation of the first device by a user of the first device at a first time, wherein the reference usage data comprises one or more of an email log or a cellular communication log; and
reference device feature characteristics comprising a software feature and a hardware feature of the first device at the first time;
receiving, by the host computer system, a request to enable the first device to conduct a transaction;
receiving, by the host computer system, current fingerprint data associated with the first device, wherein the current fingerprint data comprises:
current device usage data corresponding to operation of the first device by the user of the first device at a second time, wherein the current device usage data comprises one or more an email log or a cellular communication log; and
current device feature characteristics comprising a software feature and a hardware feature of the first device at the second time;

determining, by the host computer system, a number of previous transactions performed by the first device;
retrieving, by the host computer system, a matching threshold associated with the first device based on the number of previous transactions performed by the first device;
comparing, by the host computer system, the reference fingerprint data associated with the first device to the current fingerprint data associated with the first device using the matching threshold;
verifying the current fingerprint data of the first device based on the matching threshold; and
in response to verification of the current fingerprint data, enabling, by the host computer system, the first device to conduct a transaction.

16. The one or more processor readable non-transitory computer-readable storage media of claim 15, wherein the matching threshold is associated with the first device, and wherein the set of acts further comprises:
decreasing the matching threshold associated with the first device in response to the first device conducting a transaction.

17. The one or more processor readable non-transitory computer-readable storage media of claim 15, wherein the matching threshold is associated with the first device, and wherein the set of acts further comprises:
increasing the matching threshold associated with the first device based on an amount of time having passed since a previous transaction conducted by the first device.

18. The one or more processor readable non-transitory computer-readable storage media of claim 15, wherein the set of acts further comprises:
in response to the first device conducting a transaction, updating the reference fingerprint data associated with the first device, wherein the current fingerprint data is used to update the reference fingerprint data.

19. The one or more processor readable non-transitory computer-readable storage media of claim 15, wherein the set of acts further comprises:
receiving a second request to enable the first device to conduct a transaction;
receiving updated current fingerprint data associated with the first device, wherein the updated current fingerprint data is received concurrently with or subsequent to the second request to enable the first device to conduct a transaction;
performing a second comparison between the reference fingerprint data associated with the first device, and the updated current fingerprint data associated with the first device; and
disabling the first device from conducting a transaction, based on the results of the second comparison between the reference fingerprint data associated with the first device, and the updated current fingerprint data associated with the first device.

\* \* \* \* \*

UNITED STATES PATENT AND TRADEMARK OFFICE
CERTIFICATE OF CORRECTION

PATENT NO. : 10,861,012 B2  
APPLICATION NO. : 16/050133  
DATED : December 8, 2020  
INVENTOR(S) : Mehew et al.

It is certified that error appears in the above-identified patent and that said Letters Patent is hereby corrected as shown below:

In the Claims

In Column 19, Claim 6, Line 60, please delete "set of"

In Column 20, Claim 11, Line 62, please delete "claim 10" and insert -- claim 9 --

In Column 21, Claim 12, Line 1, please delete "claim 10" and insert -- claim 9 --

In Column 21, Claim 13, Line 7, please delete "claim 10" and insert -- claim 9 --

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*